United States Patent [19]

Sunde

[11] 4,191,868
[45] Mar. 4, 1980

[54] SEISMIC SAFETY CUTOFF SWITCH

[76] Inventor: Paul B. Sunde, 11356 Baird Ave., Northridge, Calif. 91324

[21] Appl. No.: 936,782

[22] Filed: Aug. 25, 1978

Related U.S. Application Data

[62] Division of Ser. No. 745,483, Nov. 26, 1976, Pat. No. 4,131,124.

[51] Int. Cl.² .......................................... H01H 35/14
[52] U.S. Cl. .................................................... 200/61.5
[58] Field of Search ..................... 200/61.45 R, 61.48, 200/61.5, 61.52, 61.53

[56] References Cited

U.S. PATENT DOCUMENTS

| | | | |
|---|---|---|---|
| 941,033 | 11/1909 | Pardee | 137/45 X |
| 1,901,554 | 3/1933 | De Wilde | 200/61.48 X |
| 2,158,753 | 5/1939 | Hansen | 137/45 |
| 2,254,294 | 9/1941 | Kimmell | 200/61.45 R |
| 2,255,965 | 9/1941 | Brandon | 137/45 X |
| 2,783,321 | 2/1957 | Richardson | 200/61.48 X |
| 3,022,392 | 2/1962 | Clemson | 200/61.5 |
| 3,602,660 | 8/1971 | Eslinger | 200/61.5 |
| 3,703,617 | 11/1972 | Burnett | 200/61.5 |
| 3,745,277 | 7/1973 | Shawcross et al. | 200/61.5 |
| 3,927,689 | 12/1975 | Sharp | 137/45 |
| 4,000,408 | 12/1976 | McCartney | 200/61.5 X |

FOREIGN PATENT DOCUMENTS

| | | | |
|---|---|---|---|
| 1187122 | 9/1959 | France. | |
| 5132 | of 1914 | United Kingdom | 137/45 |
| 1423356 | 2/1976 | United Kingdom | 200/61.5 |

*Primary Examiner*—James R. Scott
*Attorney, Agent, or Firm*—Arthur V. Doble

[57] ABSTRACT

A seismic safety cutoff device responsive to external forces such as earthquakes, for use with an electrical switch for controlling the flow of electricity, including a housing adaptable to a switch mechanism having a spring-biased control stem, the safety cutoff device also having a substantially vertically-mounted rod which is pivotable near its upper end to permit movement in any horizontal direction of a weight at its lower end for releasing the spring-biased stem upon it's deflection by an external force. A stem-positioning member is connected to the control stem and extends outward through the housing for easy visual inspection and for ease of re-setting the device after being tripped by an external force.

2 Claims, 3 Drawing Figures

SEISMIC SAFETY CUTOFF SWITCH

This is a division of application Ser. No. 745,483 filed Nov. 26, 1976 now U.S. Pat. No. 4,131,124.

BACKGROUND OF THE INVENTION

1. Field of the Invention

The invention relates to an improved valve cutoff control device. It more particularly relates to an improved seismic safety cutoff device for controlling a valve or an electrical switch during the application of an external force such as an earthquake or an explosion.

2. Description of the Prior Art

Various forms of seismic safety cutoff devices have found extensive use by building safety and construction personnel over the years. The need for automatically shutting off valves or switches, in the event of a natural disaster such as an earthquake, has long existed. But of the known prior art devices each has had various problems or disadvantages in their application, performance, maintenance or construction.

Prior patents disclosed various improvements in safety control apparatus closer examination of these inventions discloses the need for improved devices. Of these devices, several were even specifically designed as an earthquake safety cutoff device. Most of them were designed to be responsive to forces and motion in all horizontal directions. Many of these devices require the use of tools to reset the apparatus once it had been actuated. Many of the devices could not be reset without shutting off the main control valves in some other location. Only a few could be easily functionally tested after installation. Very few provided any visual indication of the device being in an operable position after installation and most of the devices did not provide for adaptability to existing valve structures. Many of the devices appear to be fragile and were not tamper-resistant. These prior art devices generally were not designed for high reliability, simplicity and low cost. Several of these devices were not independent of the pressure in the line they were to control. And, lastly, none of the devices were practically suitable for use in safety cutoff of electrical switch devices.

SUMMARY OF THE INVENTION

Applicant herein has conceived of a seismic safety cutoff device for use with a valve for controlling the flow of gases or liquids or for use with an electrical switch, to protect property from secondary seismic damage such as fire damage produced by broken gas pipes and electrical short circuits and water damage produced by broken water pipes. Within a housing adaptable for integral mounting to a valve body, a substantially vertically-mounted rod, which is pivotable to permit movement in any horizontal direction of a weight suspended at its lower end, is in end-to-end contact with a vertical re-set rod disposed between a spring-biased valve stem and the pivotable rod. The weight is movably positioned on the pivotable rod to provide a variable adjustment to respond to predetermined forces externally applied to the valve. This device is also known as a trip mechanism.

The re-set rod has a pair of integral levers extending through the housing and is used to manually bias the stem of the valve to its open position overcoming the biasing force of the valve stem spring. When the levers are in their maximum upward position the pivotable rod will return to a vertical position due to the action of the weight on the rod. The levers also provide a visual indication of the position of the valve.

The housing also contains an aperture suitable for facilitating testing of the device and to provide a vent to prevent moisture accumulation.

This seismic safety cutoff device is actuated whenever a predetermined external force is applied to the valve, causing the weight to shift, thus tilting the pivotable rod as the spring closes the valve and displaces the re-set rod from its normal upward position.

This device can minimize secondary seismic damage to property by immediately interrupting gas, water and electrical services at their respective connections to the property. After making repairs to water and gas pipes and electrical circuitry, the device can be re-set to return the given service to normal operation.

The present invention shows several features of novelty over the prior art including the capability to be adapted for use with an electrical switch as well as a valve.

It is an object of this invention to provide a seismic safety cutoff device that requires no power source and is responsive to movement or external forces acting thereon caused by an earthquake or explosion.

It is another object of this invention to provide a seismic safety cutoff device having a substantially vertically-mounted pivotable rod and a weight suspended therefrom at its lower end for releasing a spring-biased valve stem upon its deflection by an external force.

It is another object of this invention to provide a seismic safety cutoff device having a vertical re-set rod positioned between a valve stem and the pivotable rod for easy visual inspection, testing and for ease of re-setting the device upon actuation without the use of special tool or replacement parts and without shutting off another valve in some other location. It is another object of this invention to provide a seismic safety cutoff device having a housing which is adaptable for use with existing valve structures of the type having a spring-biased valve stem.

It is another object of this invention to provide a seismic safety cutoff device which is responsive to movement or forces in any horizontal direction.

It is still a further object of this invention to provide a seismic safety cutoff device which is rugged in construction, inexpensive to manufacture and is also highly reliable in operational characteristics.

For a better understanding of this present invention, together with other and further objects thereof, reference is made to the following description taken in connection with the accompanying drawings in which preferred embodiments of the invention are illustrated, the scope of the invention being pointed out in the appended claims.

DESCRIPTION OF THE PREFERRED EMBODIMENTS

Figure 1:
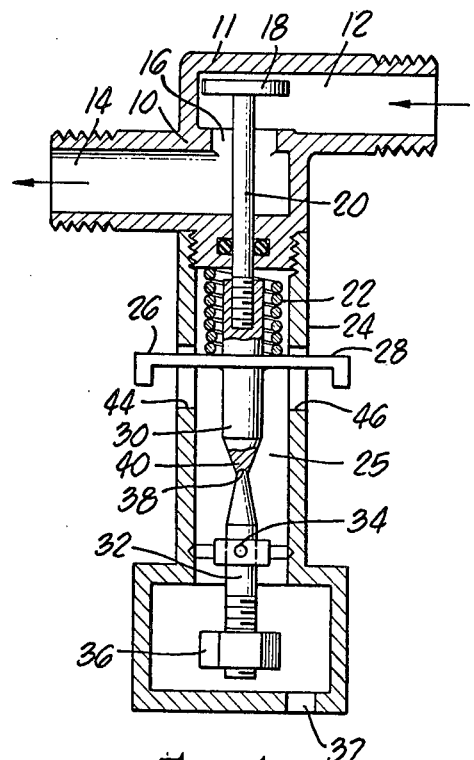
FIG. 1 is a cross-section view of the device as applied to and mounted upon an existing valve having a valve stem externally biased for controlling the flow of liquids or gasses.

In FIG. 1 there is shown a preferred embodiment of this invention connected to valve 10 in its normally open position. At 11 there is shown a valve body structure of a type found in common use in residential, commercial and industrial applications. Contained in valve 10 there is a flow chamber 12 through which a fluid may be communicated into flow chamber 14 past a control port 16 during normal operation of the valve 10. A flow-blocking disc 18 is located in chamber 12 and is integrally connected to a valve stem 20 which is biased to a downward closed position by a resilient biasing means which in this embodiment is a spring 22 located in the upper portion of the housing 24 of the seismic safety cutoff trim mechanism 25. Spring 22 exerts a direct force on a valve re-set means which in this embodiment includes levers 26 and 28 and re-set rod 30 located within housing 24. Rod 30 may be connected to valve stem 20 in any suitable fashion such as by screwing together the adjacent threaded portions at the upper end of re-set rod 30 and the lower end of valve stem 30 as shown in this embodiment in FIG. 1.

A substantially vertically-mounted pivotable rod 32 which in this embodiment is shown to be of a gimbled-type is disposed within the lower portion of housing 24 is in end-to-end contact with re-set rod 30 and is adapted to permit motion of the upper and lower ends of rod 32 in any horizontal direction. At 34 there is shown a pivot device, the typical structure of which is a common and well known art. The pivot device 34 may be of the gimble type or a ball joint or any other suitable means arranged so as to permit rod 30 end movement in any horizontal direction.

In this embodiment a means responsive to a predetermined level of seismic force is a disc-shaped weight 36 threadably connected to the lower end of gimbeled rod 32 for variable positioning of the weight 36 with respect to rod 32. Upon subjection of a predetermined level of horizontal force to the trip mechanism 25, weight 36 will be deflected in a substantially horizontal direction causing the tip 38 of rod 32 to disengage its points contact with the lower tip 40 of re-set rod 30 as a result of pivotal action through the pivot device 34. Once tips 38 and 40 have become so disengaged and rod 32 is deflected any horizontal direction, the action of spring 22 will bias the re-set rod 30 downward by exerting force on levers 26 and 28 as previously described herein. To aid in preventing disengagement of tips 38 and 40 from vibration, tip 38 may be slightly concave and tip 40 may have a slightly rounded point as shown in the drawings.

Weight 36 and the lower end of rod 32 are located in the lower portion of housing 24. This lower portion of housing 24 is generally circular and is larger in diameter than the upper portion of housing 24 to permit deflection of weight 36 in a sufficient amount to provide a proper amount of deflection of each end of rod 32 in a substantially horizontal direction.

Housing 34 contains a small port 32 in its lower end to provide venting and drainage of any moisture which might otherwise accumulate in the housing 34. The port 32 also provides an access for testing of this seismic safety cutoff device. Any convenient thin tool may be inserted through port 32 for the purpose of deflecting weight 36 thereby actuating valve stem 20 in a manner as previously described herein to test the operability of this device.

Figure 2:
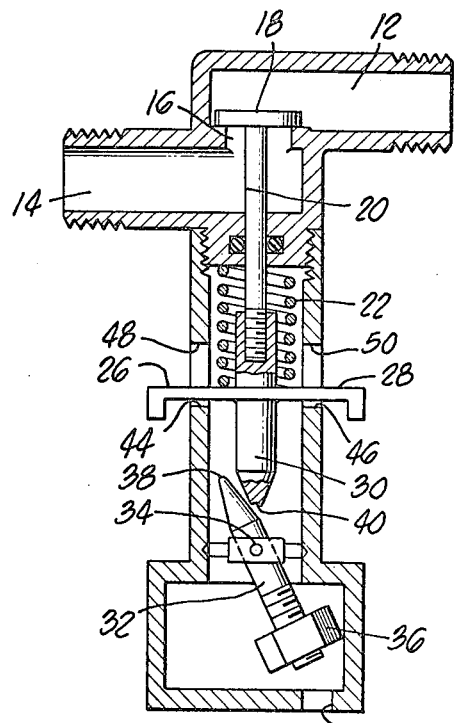
FIG. 2 is a cross-sectional view of the device as applied to and mounted upon the valve of FIG. 1 after the trip mechanism has been activated and the valve is moved into its closed position.

FIG. 2 shows the same preferred embodiment of this invention in a "valve-closed" position. Weight 36 is shown here after its deflection in a substantially horizontal direction with tip 38 of rod 32 being disengaged from tip 40 of re-set rod 30. Spring 22 is shown in an extended position against levers 26 and 28 as re-set rod 30 is in its lowest position along with valve stem 20 which is connected to rod 30. Control part 16 is shown being covered by disc 18 which is connected to valve stem 20 as previously described.

By visual reference to levers 26 and 28 a person can quickly and easily ascertain whether this device is set in the "valve-open" or the "valve-closed" position. If the levers 26 and 28 are down against the surfaces 44 and 46 of housing 24, the pivotable rod 32 has been tripped, either purposely or accidentally, and the valve 10 is in is "closed" position. The device may be readily reset by simply grasping reset levers 26 and 28 and lifting upward on them, against the biasing force of spring 22, causing the reset rod 30, valve stem 20 and disc 18 to be moved into their normal "valve-open" positions. Re-set rod 30 is in its uppermost position when levers 26 and 28 are in respective contact with surfaces 48 and 50 of housing 24. While in this position, the effect of gravity on weight 36 and rod 32 will bring the tip 38 of rod 32 into vertical alignment with the lower tip 40 of re-set rod 30 permitting their further engagement and retention of valve 10 in its open position until another force of a predetermined magnitude is applied to this device to trip it and send the valve 10 back into a "closed" position again.

Figure 3:
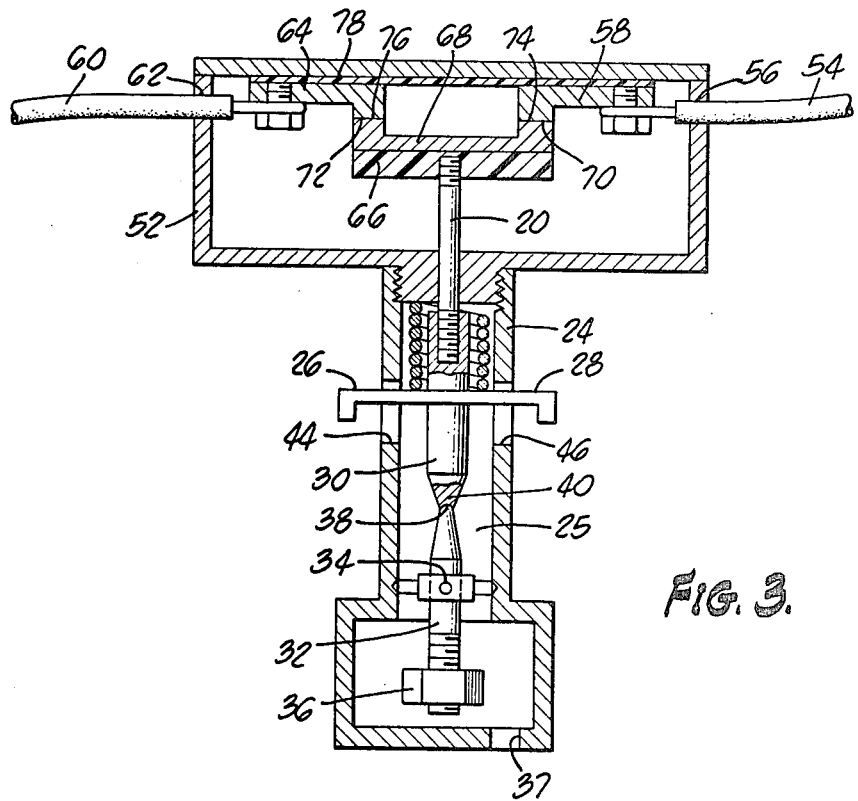
FIG. 3 is a cross-sectional view of the device in an alternate embodiment depicting its use as applied to an electrical switch apparatus.

FIG. 3 discloses another preferred embodiment of this invention depicting its application in conjunction with an electrical circuit. The basic trip mechanism 25 is shown in threadable connection with an electrically non-conductive weatherproof-type electrical contactor housing 52. An electrical wire 54 enters housing 52 through a port 56 and is terminated at a contact bar 58 which is mounted within and to the housing 52. Another electrical wire 60 passes through port 62 of housing 52 opposite and across from wire 54. Wire 60 is terminated at a contact bar 64 which is also mounted within and to the housing 52.

In this embodiment, a re-set rod 30, which in this embodiment acts as a switch re-set means, is threadably connected to stem 20. An electrically non-conductive bar 66 is threadably mounted to the upper end of stem 20 and serves as an insulator between stem 20 and a contact bar 68. Actuation of contact bar 68 provides the function of a breaker in an electrical switch as its contact points 70 and 72 are moved into contact with points 74 and 76, respectively, of bars 58 and 64 to make the circuit, and away from points 74 and 76 of bars 58 and 64 to break the circuit.

The operation of the trip mechanism 25 is identical to that described previously herein relative to the earlier embodiment shown in FIGS. 1 and 2.

What I claim as new is:

1. An improved seismic safety cutoff device for use with an electrical switch device, of the type having an electrical contactor housing and a control stem, for interrupting the flow of current in an electrical circuit, the improvement comprising:
    (a) housing means connected to the electrical contactor housing;

(b) switch re-set means disposed within said housing means, said switch re-set means having a lever extending outward through said housing, for re-positioning the control stem without disassembly of the cutoff device after the flow of current in said electrical circuit has been interrupted, and for providing a visual indication of switch position;
(c) resilient biasing means vertically disposed within said housing means for exerting a force upon said switch re-set means and urging said switch re-set means and control stem to a switch-open position;
(d) a substantially vertically-mounted pivotable rod within said housing means for engaging and retaining the control stem in it's switch-closed position, the pivotable rod being position-oriented by the force of gravity; and
(e) means responsive to a predetermined level of seismic force adjustably mounted on said pivotable rod, whereby the pivotable rod will be deflected upon application of said force permitting the re-set means and control stem to be displaced substantially downward by the action of the resilient biasing means thereby opening the switch and interrupting the flow of current through the switch.

2. An improved seismic safety cutoff device for use with an electrical switch having an outer body and control stem for interrupting the flow of current in an electrical circuit, the improvement comprising:

(a) housing means in which there is provided a threaded segment of said housing means connected to a correspondingly threaded segment provided in the outer body of the electrical switch;
(b) a first substantially vertically-mounted rod connected to the lower end of the control stem for placing the switch in its closed position by moving said rod and control stem to their upward position;
(c) a re-set lever integrally connected to said first rod to provide a visual indication of the position of the electrical switch and to move said first rod upwardly;
(d) a coil spring disposed within said housing means so constructed and arranged as to act upon and urge said re-set lever, rod and control stem to the switch-open position;
(e) a substantially vertically-mounted pivotable rod within said housing means disposed in end-to-end contact with the first rod to retain the control stem in the switch-closed position; and
(f) a weight threadably mounted on said pivotable rod to enable its position thereon to be varied to permit the pivotable rod to be deflected in response to any pre-selected seismic force level, whereby the first rod and control system will be displaced downwardly by the action of the spring thereby interrupting the flow of current through the switch.

* * * * *